United States Patent [19]

Becker et al.

[11] 4,312,969

[45] Jan. 26, 1982

[54] EXOTHERM CONTROL IN POLYMERIZATION

[75] Inventors: Harold L. Becker; Rudolf S. Buriks, both of St. Louis, Mo.; James G. Dolan, Granite City, Ill.

[73] Assignee: Petrolite Corporation, St. Louis, Mo.

[21] Appl. No.: 140,916

[22] Filed: Apr. 16, 1980

[51] Int. Cl.$^3$ ............................................. C08F 2/32
[52] U.S. Cl. .............................. 526/206; 260/29.6 H; 526/74; 526/307.6; 526/303.1
[58] Field of Search ........................................ 526/206

[56] References Cited

U.S. PATENT DOCUMENTS 3,282,874 11/1966 Friedrich et al. ............. 260/29.6 H
3,284,393 11/1966 Vanderhoff et al. ............... 526/207
3,767,629 10/1973 Vallino, Jr. et al. ................ 526/235

*Primary Examiner*—Stanford M. Levin
*Attorney, Agent, or Firm*—Sidney B. Ring; Hyman F. Glass

[57] ABSTRACT

This invention relates to an exothermic emulsion polymerization method characterized by the presence of a low boiling fluid as a component of one of the phases of the emulsion system, said low boiling fluid having the following characteristics:

(1) It is sufficiently inert so that it does not interfere with the polymerization reaction
(2) It is capable of maintaining by reflux the polymerization system at relatively even and homogeneous temperature.

This is exemplified by the use of a halogenated hydrocarbon boiling below about 50° C. as the low boiling fluid.

7 Claims, No Drawings

EXOTHERM CONTROL IN POLYMERIZATION

This invention relates to the use of a low-boiling solvent in a water-soluble vinyl addition polymerization to control its exotherm.

There are several methods that may be used for producing concentrated water-soluble vinyl addition polymer reaction masses. Certain of these include an emulsion method, the inverse emulsion method, the suspension method, and the inverse suspension method. All of these methods have a disadvantage, namely, that there is no simple way of safely handling the heat evolved from a large reactor when concentrated monomer charges are polymerized by these methods. As a result of this problem, the typical monomer loading in a large scale plant reactor is of the order of 15%. Monomer loading in this range is difficult to control and any loading in excess of this level is restricted since the reaction is completely uncontrollable. The fact that low-boiling solvent controls the exotherm is very significant. It means that a reaction can be evenly and homogeneously controlled within reasonable temperature limits. It also means that higher molecular weight polymers which appear to be favored by high monomer levels can be reacted safely. Further, the reaction can be conducted as speedily as possible within the limits of temperature change and heat transfer surfaces.

Thus, this invention provides a method to control the reaction rate in certain vinyl polymerization processes.

This invention also provides such control of the reaction as to allow monomer loading in excess of 15%.

This invention further controls the exotherm rate in such a way as to prevent excessive heat accumulation in a plant size reactor.

U.S. Pat. No. 3,284,393 is a water-in-oil emulsion system. This system involved the formation of an emulsion by the addition of a monomer phase to an oil phase containing an emulsifying agent. The monomer phase is comprised of a water-soluble ethylenic unsaturated monomer in an aqueous solution. The oil phase is any inert hydrophobic liquid such as hydrocarbons and substituted hydrocarbons. Any emulsifying agent which is oil soluble is acceptable.

In accordance with the teachings of U.S. Pat. No. 3,284,393, all known polymerizable water-soluble ethylenic unsaturated monomers, the polymers of which are insoluble in the continuous oil phase, can be polymerized by a water-in-oil emulsion polymerization process to give a polymeric latex. Such monomers have a water solubility of at least 5 weight percent and include acrylamide, methacrylamide, acrylic acid, methacrylic acid, vinylbenzyl dimethylammonium chloride, alkali metal and ammonium salts of 2-sulfoethylacrylate, or sodium styrene sulfonate, 2-aminoethylmethacrylate hydrochloride, alkali metal and ammonium salts of vinylbenzyl sulfonates and the like. When aqueous solutions of the monomers are used, they can be varied widely in monomer content. Proportions between 100 and 5 percent by weight monomer corresponding to 0 to 95 percent water are used, depending upon the monomer and the temperature of polymerization. The ratio of monomer phase to oil phase is also widely variable, advantageously between 30 and 70 parts of the former to between 70 and 30 parts of the latter by weight. A monomer phase to oil phase ratio of about 70 to 30 is preferred.

In order to emulsify the monomer phase into the oil phase to give a water-in-oil emulsion, an emulsifying agent of the water-in-oil type is used in amount ranging between 0.1 and 10 percent by weight of the oil phase. Any conventional water-in-oil emulsifying agent can be used, such as hexadecyl sodium phthalate, sorbitan monooleate, sorbitan monostearate, cetyl or stearyl sodium phthalate, metal soaps, and the like.

The oil phase can be any inert hydrophobic liquid which can readily be separated from the disperse phase polymeric product.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the product marketed by Shell Chemical Company under the product name "SHELLFLEX 131." Typical specifications of this hydrocarbon liquid are set forth in the table below:

TABLE 1

"SHELLFLEX 131" Specifications

| | | |
|---|---|---|
| Gravity, °API | D-287 | 30.8 |
| Pounds per Gallon | | 7.260 |
| Color, Saybolt | D-156 | +25 |
| Flash, C.O.C, °F. | D-92 | 300 |
| Pour Point, °F. | D-97 | −65 |
| Viscosity, SSU @ 100° F. | D-445/D-2161 | 58.6 |
| Viscosity, SSU @ 210° F. | D-445/D-2161 | 34.4 |
| Aniline Point, °F. | D-611/D-1012 | 182 |
| Viscosity Gravity Constant | | 0.838 |
| Reference Index @ 10° C. | D-1218 | 1.4752 |
| Clay/Gel Analysis %w | D-2007 | |
| Polar Compounds | | 0.4 |
| Aromatics | | 8.2 |
| Saturates | | 91.4 |
| Distillation, °F. @ 10mm Hg | D-1160 | |
| IBP | | 300 |
| 10% Recovered | | 323 |
| 50% Recovered | | 365 |
| 90% Recovered | | 425 |

Free radical initiators useful in polymerizing ethylenic unsaturated monomers, such as benzoyl peroxide, lauroyl peroxide, 2,2'-azobis (isobutyronitrile), potassium pursulfate and the like are used in the polymerization in amounts ranging between 0.002 to 0.2 percent by weight of the oil or monomer phase, depending upon the solubility of the initiator. Polymerization can also be carried out using high energy electrons from a Van de Graaff accelerator, etc., or ultraviolet irradiation.

Elevated reaction temperatures, advantageously between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired.

U.S. Pat. No. 3,282,874 is a water-in-oil inverse suspension system. This shows that aqueous solutions of water-soluble unsaturated monomers, and mixtures thereof, can be suspended in an oil phase to form a suspension of globules ranging between 10 microns and 2 mm. in diameter and polymerized therein to give polymeric products in bead form having a controlled size.

A water-in-oil suspending agent is dissolved or suspended in an oil phase. An aqueous solution of monomer or mixed monomers is added to the oil phase with vigorous agitation until the aqueous solution is suspended in the oil phase as globules ranging between 10 microns and 2 mm. in diameter.

The reaction temperature is then raised to between 20° and 100° C. with continued mild agitation to prevent separation of phases or adhesion of polymer beads. Polymerization is initiated by an added free radical generator or by ultraviolet or X-radiation. The reaction is continued, generally with mild agitation, until conversion is substantially complete. Polymeric beads are thereby formed, which are separated from the reaction medium, washed and dried.

The suspending agent is a solid or liquid substance having a low hydrophile-lyophile balance, i.e., is preponderantly hydrophobic. Inorganic hydroxy-oxides having substituent hydrocarbonylsilyl, hydrocarbonylsilylene or hydrocarbonylsilylidyne radicals are particularly useful suspending agents. Other useful solid suspending agents include low hydrophile-lyophile kaolin treated with rosin amine, bentonite treated with organic ammonium cation yielding agents, etc. The disclosures of U.S. Pat. No. 3,284,393 and U.S. Pat. No. 3,282,874 are incorporated herein by reference.

All known water-soluble unsaturated monomers can be polymerized by the inverse suspension polymerization process of this invention. Such monomers include acrylamide, methacrylamide, acrylic acid, methacrylic acid, vinylbenzyl trimethylammonium chloride, alkali metal and ammonium salts of 2-sulfoethylacrylate, 2-aminoethyl methacrylate hydrochloride, alkali metal and ammonium salts of vinylbenzyl sulfonate, etc. Aqueous solutions of the monomers to be polymerized can be varied widely in monomer content, i.e., from about 5 to 80 weight percent of monomer in water, depending upon the monomer and the polymerization temperature. The ratio of aqueous monomer phase to oil phase is also widely variable, advantageously from about 5 to 75 weight parts of aqueous phase to 95 to 25 parts of oil phase.

The oil phase can be any inert hydrophobic liquid which can be separated readily from the polymeric product. Of such liquids the hydrocarbons and chlorinated hydrocarbons such as toluene, xylene, o-dichlorobenzene, monochlorobenzene, propylene dichloride, carbon tetrachloride, etc. are advantageously used. Toluene and xylene are preferred as oil phase liquids.

The reaction time is widely variable depending upon the catalyst system, and ranges generally between about 10 minutes and two hours at temperatures between about 20° and 100° C.

The advantages of these processes occur in plant size reactions. The amount of heat that is released is not readily dissipated by normal cooling facilities when the monomer concentration exceeds 15%. A plant sized reactor may be defined for purposes of this disclosure as one which is at least 100 gallons; preferably, one which is at least 1,000 gallons. Generally, the reactor vessels may be as large as 8,000 to 12,000 gallons. If the reaction is performed at monomer loadings in excess of 15%, the reaction rate cannot be controlled. Essentially, the reaction rate gets out of control and the temperature increases rapidly.

U.S. Pat. No. 3,767,629 discloses that the introduction of trace quantities of air to the reaction stops the reaction progress instantly. The fact that air retards or stops a polymerization reaction has been long known to the art. U.S. Pat. No. 3,767,629 involves the application of this known fact as a reaction controlling procedure, in that it is utilized in conjunction with nitrogen as a device to control the overall rate of polymerization and therefore the rate of heat generation. Consequently, when maximum reactor cooling is incapable of maintaining the desired reaction temperature, appropriate introduction of air can slow the rate of conversion to balance heat generation with heat removal at the desired reaction temperature. This procedure can be followed repeatedly until all of the monomer has been reacted and still produce a high molecular weight polymer without in any way affecting the properties of the finished product.

U.S. Pat. No. 3,767,629 claims that the greatest utility of its procedure is when the heat extraction capability is insufficient to control the bulk reaction temperature of a plant scale reactor having a high monomer concentration. Without this throttling procedure the temperature would be uncontrollable in such a reaction.

Thus, one solution to the problem of controlling this exotherm is disclosed in U.S. Pat. No. 3,767,629 where air is used as a "brake" to control the reaction rate and thus its exotherm. Since U.S. Pat. No. 3,767,629 controls the exotherm by slowing down the reaction rate, it does so by interfering with the reaction mechanism itself.

Therefore, it is desirable to control the exotherm in emulsion polymerization without interfering with the reaction mechanism itself.

We have now discovered that certain inert low boiling fluids are capable of dissipating the heat generated in such reactions without interfering with the reaction mechanism itself. By incorporating a low boiling fluid in one of the phases of the emulsion polymerization system, the system is evenly and homogeneously cooled, so that spot overheating is avoided. Stated another way, the system is cooled from the core out. Thus, by using the low boiling fluids of this invention, large plant scale reactions having a high monomer concentration can be carried out without interfering with the reaction itself as is done in U.S. Pat. No. 3,767,629.

It has been found that by the use of a low boiling ($<50°$ C.) inert solvent as (part of) the continuous external phase, it becomes easily feasible to control the temperature and therefore polymerization at the desired level by carrying out the reaction (even with much higher monomer loading) at partial or full reflux conditions in a closed system at atmospheric or slightly elevated pressure. The refluxing low boiling solvent efficiently removes reaction heat by evaporation throughout the reaction medium and recondensing in the closed water cooled condensor system before returning to the reaction mass after condensation.

Although in principle any chemically inert solvent with low boiling point can be used in this application an additional requirement to be met is that this solvent is also compatible with the emulsion system and does in no manner adversely affect the stability or physical properties of the emulsion at hand.

We have now found that "FREON-113", Trichlorotrifluoroethane, a non flammable chemically inert solvent marketed by Dupont, is exceptionally suitable for use in our process. The following Table II describes this material and its specifications.

TABLE II

Properties of FC-113

| | |
|---|---|
| Scientific Name | 1,1,2-trichlorotrifluoroethane |
| Formula | $CCl_2FCClF_2$ |
| Molecular Weight | 187.39 |
| Boiling Point, 1 atmos. °C. | 47.57 |
| Freezing Point, °C. | −35 |
| Liquid Density, g/cc, 25° C. | 1.565 |
| Latent Heat of Vaporization | 35.07 cal/g(63.12 Btu/lb.) (971 Btu/lb. for water) |
| Surface Tension at 25° | 17.3 dynes/cm |
| Solubility of Water, 21.1° C. | 0.009% by weight ≈ 40 ppm |
| Solubility in Water at Saturation Pressure, 21.1° C. | 0.017% by weight ≈ 170 ppm |

Freon is completely miscible with Shellflex 131 (the preferred solvent for our inverse emulsion polymerizations) in all proportions. It is also non flammable and has very low toxicity.

Freon alone as the external phase, or any mixture of Freon with Shellflex 131 in any proportion, yields extremely stable, nicely fluid water internal emulsions exceptionally suitable for the execution of the inverse emulsion polymerization procedure described herein.

By carrying out an inverse emulsion polymerization with this Freon based external phase the reaction time in a batch process can be substantially shortened, without running the risk of a run away reaction. It has also been found that by running these polymerizations in the above manner, batch on batch production becomes possible without the need for a tedious wash and cleanup of the reactor between batches. The presence of the Freon in the external phase results in a very clean reactor interior after completion of the polymerization. A particular embodiment of this invention can be shown in the following example.

EXAMPLE 1

Preparation of a polyacrylamide latex (a) Internal Phase 332 parts water
298 parts acrylamide
10.6 parts 0.1 M $Na_2$ EDTA (b) External Phase 265 parts Shellflex 131
40 parts Sorbitan monooleate
10.6 parts Oil soluble suspending agent
0.196 parts 2,2'-Azobis(isobutyronitrile) in 4 parts of monochlorobenzene (c) Emulsion preparation, addition of Freon 113 and Polymerization A reactor is charged with the external phase and subjected to maximum vacuum to remove air and oxygen. When frothing subsides the reactor is closed with vacuum remaining. The internal phase is suction transferred to the well stirred reactor content. When all internal phase has been added and a good emulsion has formed, 385 parts of Freon (previously deoxygenated) is also stirred into the emulsion. When all the internal phase, and solvent is in the reactor, the contents are subjected to an above surface nitrogen pressure of 10–12 psi, and the nitrogen is allowed to sweep the reactor and contents for a minimum of 30 min. or until an acceptable oxygen content is obtained. (Caution, because Freon is not an inexpensive solvent, every possible precaution should be used for its recovery.) After an acceptable oxygen content is obtained the reactor and contents are brought as rapidly as possible to a kick-off temperature of 55° C. with a maximum pressure of 5 psi @55° C. and connected to a good water cooled reflux condenser (or preferably chilled ethylene glycol). When the reaction has gone into full exotherm (maximum temp. 70°–75° C. @10 psi) no external heat is required. The exotherm lasts from 23–40 min., after which time, virtually all the monomers have been converted, and the product, including Freon, takes on a clear amber appearance. After an additional 40 min. the temperature of the reactor is raised to 85° C. to strip off the freon solvent. Analysis of the resulting batch indicates virtually complete conversion of monomer.

EXAMPLE 2

Preparation of a high molecular weight anionic copolymer batch (a) Internal Phase 289 parts water
63 parts 50% NaOH
57 parts Acrylic Acid
225 parts Acrylamide
10.6 parts 0.1 M $Na_2$EDTA*

The above solution is adjusted to pH 8–9.

*Di sodium salt of Ethylene Diamine Tetraacetic acid (b) External Phase 313 parts Shellflex 131
40 parts Sorbitan monooleate
10.6 parts Oil soluble suspending agent
0.196 parts 2,2'-Azobis(isobutyronitrile) in
4.3 parts monochlorobenzene.

(c) Emulsion Preparation, Addition of Freon 113 and Polymerization

A reactor is charged with the external phase and subjected to maximum vacuum to remove air and oxygen. When frothing subsides the reactor is closed with vacuum remaining. The internal phase is suction transferred to the well stirred reactor content. When all internal phase has been added and a good emulsion has formed a (previously deoxygenated) charge of 405 parts of Freon 113 is also stirred into the emulsion. When all the internal phase, and solvent is in the reactor, the contents are subjected to an above surface Nitrogen pressure of 10–12 psi, and the nitrogen is allowed to sweep the reactor and contents for a minimum of 30 min. or until an acceptable oxygen content is obtained. (Caution, because Freon is not an inexpensive solvent, every possible precaution should be used for its recovery). After an acceptable oxygen content is obtained the reactor and contents are brought as rapidly as possible to a kick-off temperature of 55° C. with a maximum pressure of 5 psi @55° C. and open to a good water cooled reflux condenser. When the reaction has gone into full exotherm (maximum temp. 70°–75° C.) no external heat is required. The exotherm lasts from 23–40 min., after which time, virtually all the monomer has been converted, and the product takes on a nearly clear appearance. After an additional 40 min. the temperature of the reactor is raised to 85° C. to strip off the Freon solvent. Analysis indicates that virtually complete conversion of monomer to polymer was attained.

EXAMPLE 3

(a) Internal Phase 289 parts water
63 parts 50% NaOH
57 parts Acrylic Acid
225 parts Acrylamide
10.6 parts 0.1 M $Na_2EDTA$
The pH of this solution is adjusted to 8–9.

(b) External Phase 611 parts Freon 113
40 parts Sorbitan monooleate
10.6 parts Oil soluble suspending agent
0.197 parts 2,2'-Azobis(isobutyronitrile) in 4.3 parts of Monochlorobenzene (c) Emulsion Preparation A reactor is charged with the external phase and sparged with Nitrogen to deaerate the system. The internal phase is transferred into the well stirred system. When all internal phase has been added and a good emulsion has formed the temperature is quickly raised to 60° C. with periodic venting to maintain a maximum pressure below 10 psi. When the reaction has gone into full exotherm (maximum 65° C.), vigorous reflux is observed and no external heat is applied. The exotherm lasts from 30–45 minutes. Once the exotherm has subsided, additional heating is applied for one hour. At this point conversion to polymer is virtually complete. After cooling to ambient temperature, a stable latex is obtained. 315 parts of xylene are added with good stirring and the temperature is subsequently raised to 85°–90° C. to drive off the Freon 113, which can be recycled for use in the next batch. A stable latex in xylene is now the final product.

We claim:

1. In a water-in-oil emulsion polymerization method for making polymers of water soluble ethylenic unsaturated monomers which comprises: charging a reactor with an external phase, adding the internal phase which comprises a water-soluble ethylenic unsaturated monomer and forming an emulsion with said external phase, increasing the temperature of the mixture to polymerization reaction temperature, the improvement comprising, in combination therewith, of (1) adding a low boiling inert liquid boiling below about 50° C. into said reactor prior to increasing the temperature thereof to thereby vaporize said inert liquid and (2) subsequently reflux condensing said inert fluid to thus avoid spot overheating and to dissipate reaction heat without interfering with the reaction mechanism itself.

2. The method of claim 1 where the aqueous monomer-containing phase is the internal phase.

3. The method of claim 2 where the monomer comprises acrylamide, acrylic acid, derivatives thereof, or mixtures thereof.

4. In a water-in-oil emulsion polymerization method for making polymers of water soluble ethylenic unsaturated monomers which comprises: charging a reactor with an external phase, adding the internal phase which comprises a water-soluble ethylenic unsaturated monomer and forming an emulsion with said external phase, increasing the temperature of the mixture to polymerization reaction temperature, the improvement comprising, in combination therewith, of (1) adding a low boiling inert halogenated hydrocarbon liquid boiling below about 50° C. into said reactor prior to increasing the temperature thereof to thereby vaporize said inert halogenated hydrocarbon liquid and (2) subsequently reflux condensing said inert halogenated hydrocarbon to thus avoid spot overheating and to dissipate reaction heat without interfering with the reaction mechanism itself.

5. The method of claim 4 where said halogenated hydrocarbon is $CCl_2FCClF_2$.

6. The method of claim 5 where the $CCl_2FCClF_2$ is added as part of the external phase.

7. The method of claim 5 where the $CCl_2FCClF_2$ is added after the external phase has been mixed with the internal phase.

* * * * *